Feb. 22, 1949.　　　　P. BARTELT　　　　2,462,060
TRANSMISSION MECHANISM
Filed Sept. 10, 1945　　　　　　　　　3 Sheets-Sheet 1
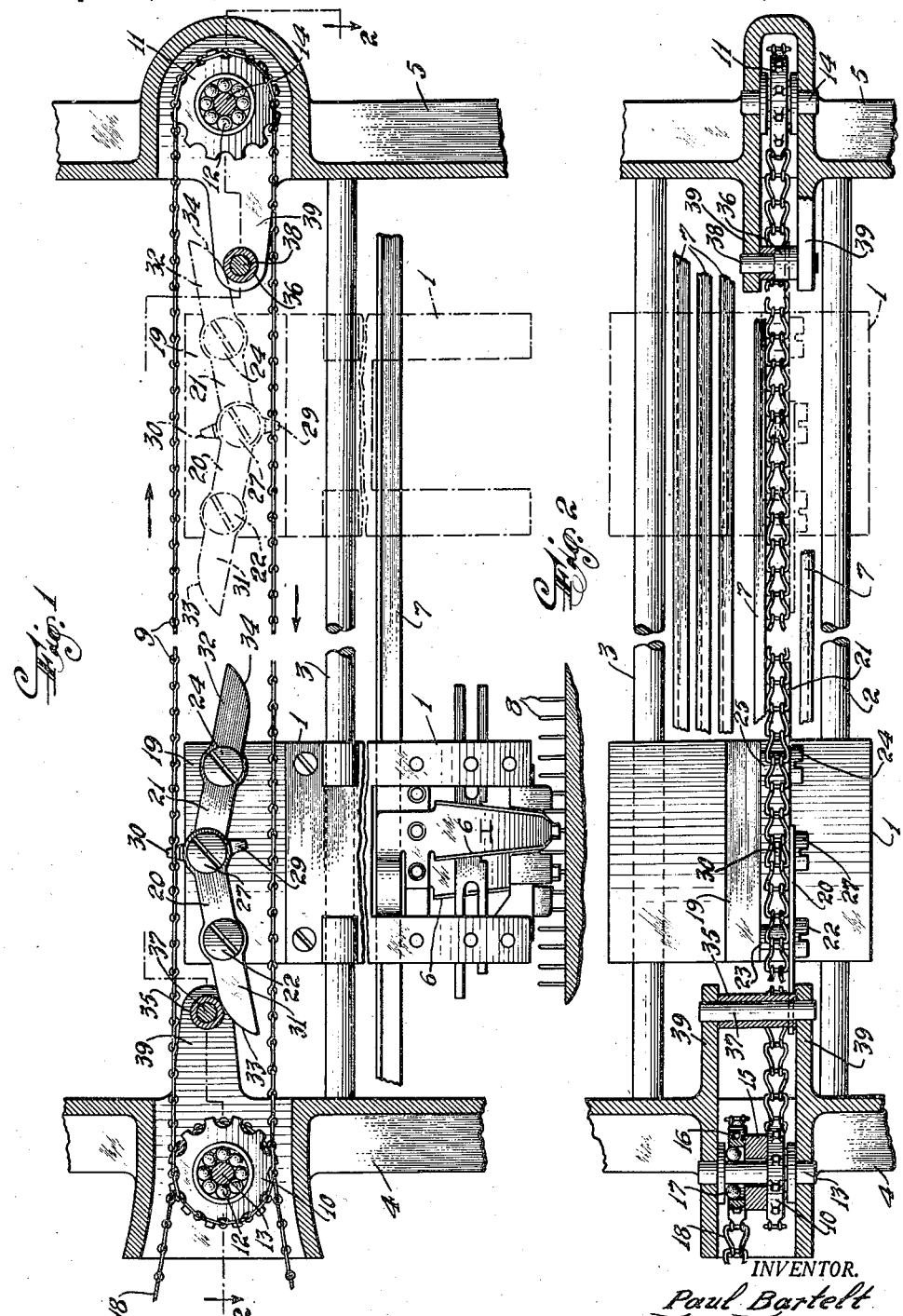
INVENTOR.
Paul Bartelt
BY
ATTORNEY

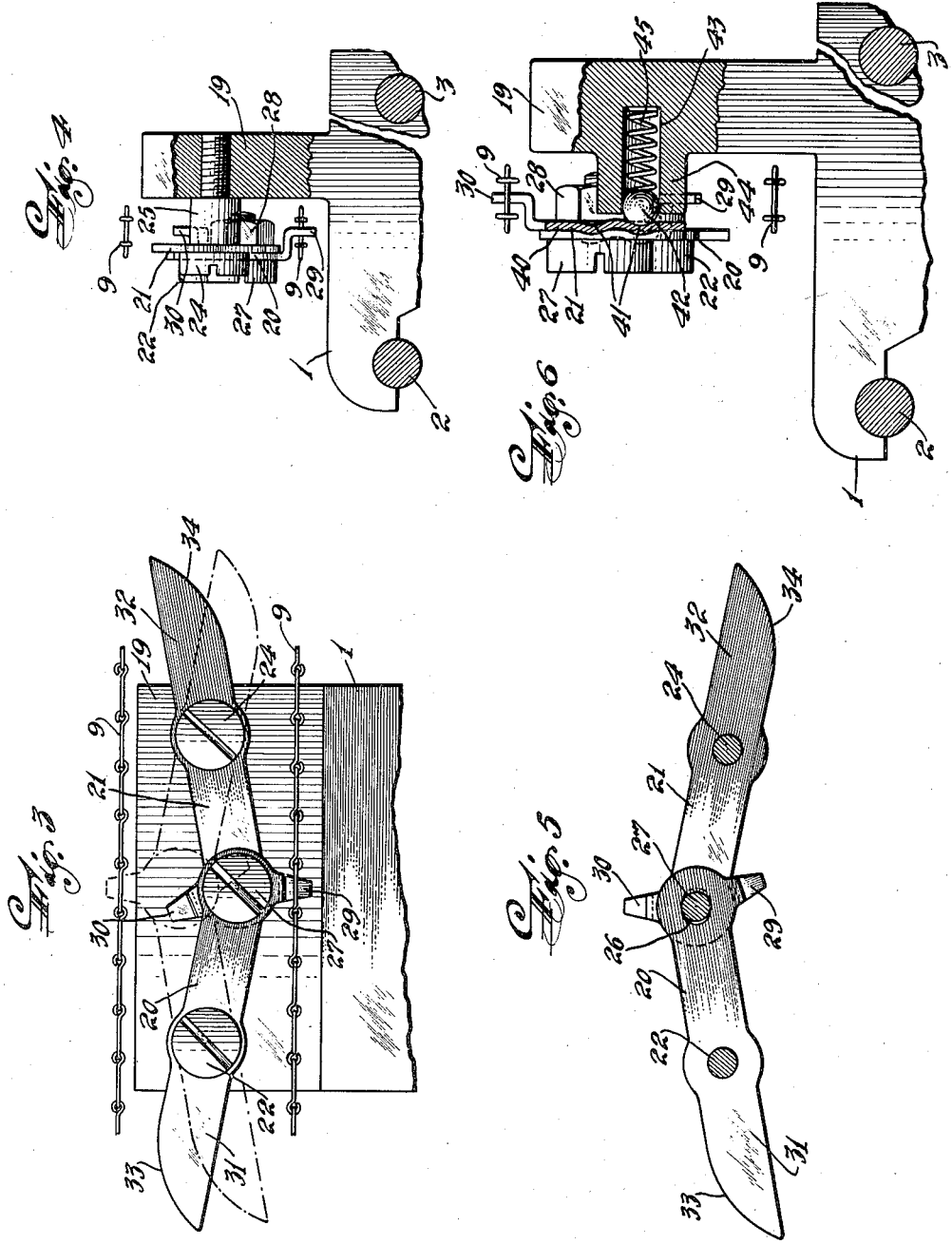

Feb. 22, 1949.    P. BARTELT    2,462,060
TRANSMISSION MECHANISM
Filed Sept. 10, 1945    3 Sheets-Sheet 3
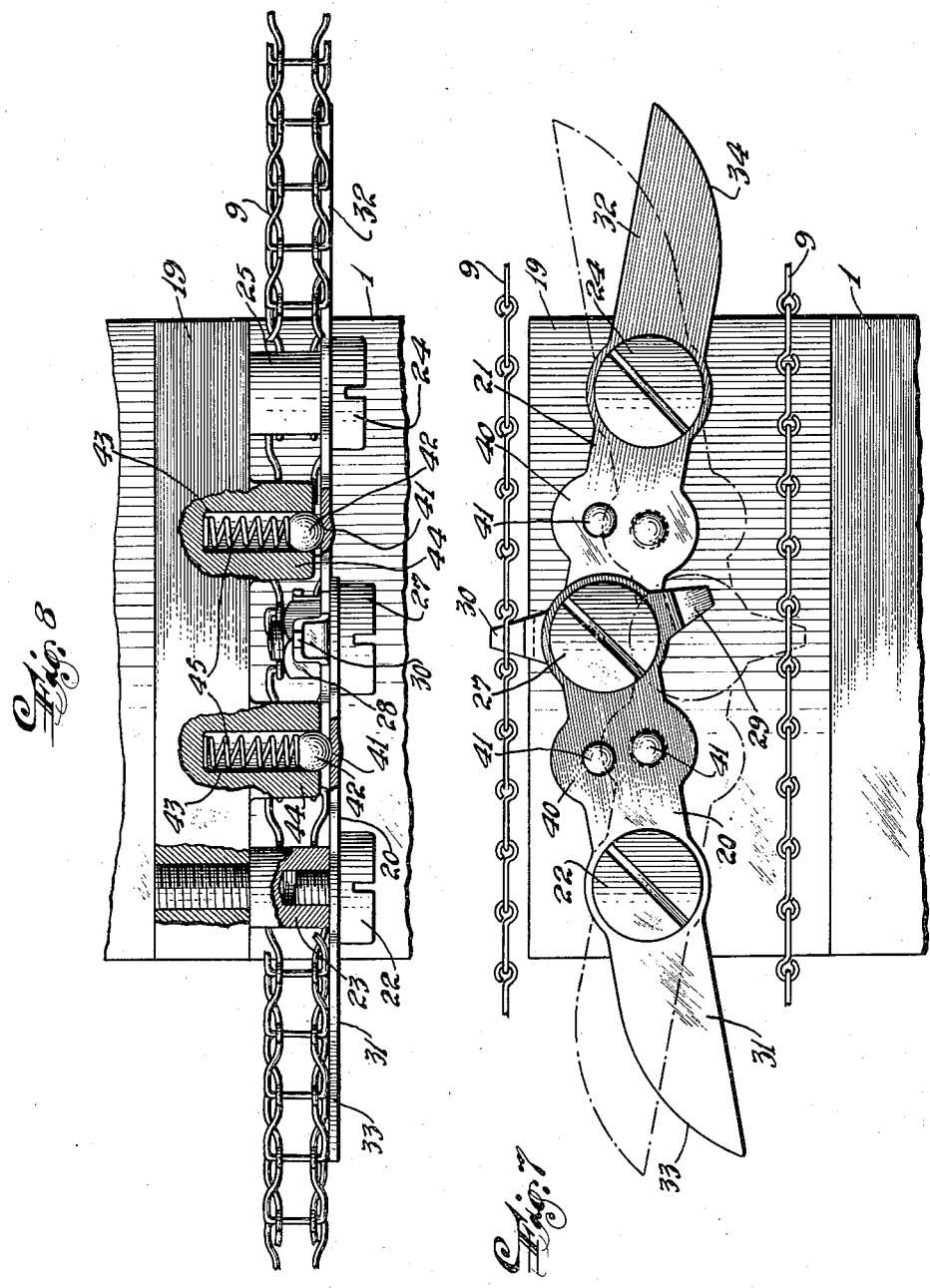
INVENTOR.
Paul Bartelt
BY
ATTORNEY Patented Feb. 22, 1949

2,462,060

UNITED STATES PATENT OFFICE 2,462,060

TRANSMISSION MECHANISM

Paul Bartelt, New York, N. Y., assignor to International Standard Electric Corporation, New York, N. Y., a corporation of Delaware Application September 10, 1945, Serial No. 615,429

11 Claims. (Cl. 74—37)

1

This invention relates to mechanism for the transmission of reciprocal motion and comprises means for deriving the motion from a continuously driven element to produce reversing traverse motion applicable to a multiple of uses. It is particularly adapted for the transmitting of a reversing rectilinear motion derived from a continuously driven drive chain adapted to impel mechanism such as selector switches of automatic telephone exchanges and the like.

An important feature of the present invention consists in the provision of a self-locking, reversible drive clutch operative by co-operative engagement with the upper and lower, or opposite, reaches of a continuously driven and endless drive chain to transmit the motions in reciprocal or reverse directions. The reversible drive clutch is designed to be shiftable for reversal of movement by engagement with stationary abutments positioned to determine the end of the travel movement. It is further of a structural form and arrangement to be self-locking in its respective shifted positions under the driving pressures. It is accordingly reliable in its operation over long periods of use without impairment of its efficiency incident to normal wear of the engaging surfaces. A further added feature to the present improvements consists in the provision of a supplemental yieldable retaining means operative to afford added security against improper shifting of the clutch parts as may occur by reason of severe shocks or vibration.

The described and other features and advantages will be more clearly understood by reference to the accompanying drawings wherein like reference characters are applied to corresponding parts in the several views.

In the drawings:

Fig. 1 is a view in front elevation with portions shown in section illustrating a preferred embodiment of the features of the invention;

Fig. 2 is a view showing the carriage and clutch mechanism in top plan and with the driving mechanism in horizontal section on line 2—2 of Fig. 1;

Fig. 3 is a detailed enlargement in front elevation showing the shiftable clutch arms in full and dotted lines in their respective shifted positions;

Fig. 4 is a view of the mechanism of Fig. 3 in end elevation;

Fig. 5 is a view of the clutch arm assembly with the fulcrum and toggle studs shown in section;

2

Fig. 6, 7 and 8 are views showing a desirable modification wherein:

Fig. 6 is a view corresponding to Fig. 4 with portions shown in vertical section;

Fig. 7 is a view in front elevation corresponding to Fig. 3, and

Fig. 8 is a top view of Fig. 7 with portions shown in horizontal section.

In the preferred embodiment of the invention as here illustrated the improved transmission mechanism and reversing clutch is embodied in an assembly adapted for the reversing drive of a selector switch of an automatic telephone exchange. Therein the carriage upon which the switch contacts are mounted is traversed back and forth with a rectilinear movement parallel to the rows of bank contact pins engaged by the switch contacts.

In the disclosed construction the member to be moved with reciprocating travel motion is a selector switch carriage 1 slidably supported in customary manner upon parallel guide rods 2 and 3 supported by the oppositely positioned frame supports or uprights 4 and 5. The carriage has mounted thereon the usual resilient contact brushes 6 for electrical contact engagement with the feed bar 7 and terminal pins 8, the latter arranged in bank contact relation having its rows parallel to the guide rods as referred to.

In this type of switch, by structure well known, the contact brushes are arranged in sets operating with only one and a different set of brushes making contact with the terminal pins in each direction of movement.

The driving means for the carriage consists of the endless feed drive chain 9 carried by the oppositely positioned sprockets 10 and 11 journalled by ball bearings 12 upon the shafts 13 and 14 supported in the respective uprights 4 and 5. The sprocket 10 has secured thereto by means of a connector sleeve 15 a second sprocket 16, having ball bearing 17 on the shaft 13 and driven in a uni-directional or continuous manner by power transmission chain 18 meshing with the teeth of sprocket 16 for driving of the feed chain in one direction as indicated by the arrows. From the operational standpoint, in effecting the reversing traverse of the carriage the drive may be considered of continuous direction for it will be understood that, while unidirectional, the driving motion, as in its illustrated use, may be periodically interrupted, by means of an electro-responsive clutch (not shown) controlled by the switch selection of an open line circuit. Its motion accordingly is continuous in direction.

The feed drive chain 9 is supported by the sprockets to position the reach portions between the sprockets parallel to the carriage guide rods 2 and 3. These tangents of the chain are also positioned in a vertical plane closely adjacent to the upper portion 19 of the carriage which extends parallel therewith and at substantially the level of the upper chain tangent. This upper portion 19 of the carriage has mounted thereon a reversing drive clutch which is automatically shifted in position at the end of each direction of movement alternately to engage the upper and lower reaches or tangents of the feed chain 9 so as to effect reverse direction movement of the carriage.

In accordance with the invention the reversing drive clutch comprises a pair of fulcrumed or pivotally supported arms extended toward each other with their inward ends connected by a toggle pin and each formed with a detent oppositely projecting for coupling engagement with the respective tangents of the feed chain upon shifting of the toggle connection past center to upper and lower positions of engagement. The pivoted arms are indicated at 20 and 21. The arm 20 is pivotally supported upon a shouldered bearing stud 22 threaded to a spacing supporting stud 23 which in turn is rigidly secured by thread connection to the carriage portion 19. The cooperating arm 21 is similarly pivotally supported on the fulcrum bearing stud 24 secured to the spacing stud 25. The spacing studs provide for overlapping of the arm inner end portions as shown in Figs. 4 and 8. These end portions are formed with elongated apertures 26 for the reception of the connecting toggle consisting of the shouldered screw stud 27 secured by lock nut 28. The elongated slots provide clearance to permit shifting of the arms the required distance to each side of and across the center line passing through their pivotal points 22—24. Each of the arms, at its inner end portion, has integral therewith a tooth or detent 29—30 adapted for coupling engagement with the feed chain by registration with the openings of the chain. The detents of the arms as shown extend or project in opposite directions providing for the engagement of detent 29 with the lower reach of the feed chain and for the engagement of detent 30 with the upper reach when shifted in opposite direction. The toggle connection prescribes that the arms shall be shifted in unison thereby to effect alternate coupling engagement as is readily understood.

Provision is made for the shifting of the clutch arms 20—21 reversely in direction at the end of each travel movement of the carriage. For this purpose the arms 20 and 21 are formed with camming extensions 31 and 32 to the outer sides of their pivotal axes; these extensions being formed with oppositely directed curved cam surfaces 33—34 respectively. Positioned in the path of the camming extensions fixed abutments are provided to be engaged by the cam surfaces to effect shifting of the clutch arms 30—31 for reversing the coupling engagement of the detents with corresponding reversal of carriage movement. The spacing of the abutments determines the length of carriage traverse as is readily understood. The abutments as here shown consist of roller sleeves 35 and 36 rotatably bearing on shafts 37 and 38 supported in spaced frame brackets 39.

The alternate direction of shifting of the clutch arms by the engagement of the cam surfaces with the abutment rollers at the end of each travel of the carriage is readily understood. The cam surface 33 is effective to shift the upper detent 30 into coupling engagement and the cam surface 34 similarly shifts the clutch arms for coupling engagement of lower detent 29 with the lower reach of the chain 9. A further operational advantage of the structural arrangement and design of the clutch arms is that the clutch device is self-locking in its respective shifted positions under the action of the driving or propelling pressures. This is effective as a result of the central position of the toggle connection with centralized positioning of the detents relative to the pivotal points 22 and 24 which determine the resultant angle of pressure transmission to the clutch arm in position of maximum permissible shift or coupling position. The clutch arm linkage system is accordingly self locking and operative to maintaining effective coupling engagement for the extent of the carriage travel.

The toggle connected, shiftable clutch arm arrangement as disclosed is of simple and robust construction and adapted for satisfactory operation over long periods of service with a minimum of attention. While a preferred embodiment of its features is here shown and described, it will be understood that varied modifications may be made therein without departing from the scope of the invention as defined in the appended claims. As an example thereof, there is shown in Figs. 6, 7 and 8 a modified clutch construction of the toggle connected type as first disclosed and further incorporating therewith supplemental and yieldable retaining means offering added security against improper release of the coupling engagement under conditions of severe shock or vibration. The structural embodiment of this feature as shown includes the toggle connected clutch arms in the form and operating arrangement as first described but wherein the arms are formed with intermediate widened portions 40 and are formed with indentations or circular recesses 41 on these inwardly disposed faces. These recesses are formed by pressing to deform the metal and are in pairs spaced equi-distant from the central longitudinal or pivotal axis of the arms and likewise equi-distant from the fulcrum point of the pivotal arms. They are spaced to correspond to the maximum distance of travel of the arms at their radial location with respect to the fulcrum. The spaced and shallow recesses 41 thus formed are co-operatively engaged by spring pressed balls fitting within bearing bores in the carriage so as to yieldingly retain the arms in the respective shifted position. As indicated the retaining balls are shown at 42 slidably fitting within bores 43 formed in lugs or bosses 44 formed on the front of carriage portion 19 and extending in close proximity to the arms. Coiled springs 45 within the bores beneath the balls urge the latter outwardly into constant pressure engagement with the arms. As is readily understood, provision is thus made for yieldingly retaining the arms in their respective terminal positions of shifting movement and thereby adding to security against disengagement of the detents with the feed chain other than effected by the shifting the arm cam portions with yielding of the ball retaining means. While each of the clutch arms is shown engaged by a yieldable retainer or lock, one arm may be provided and effective with relation to both arms in view of the toggle connection as is readily understood.

In the disclosed embodiments of the invention, the feed chain 9 is of the ladder type, but may be of any equivalent spaced pivot link construction. Moreover, as shown, the sprockets 10 and 11 have an even number of teeth and the feed chain 9 is likewise composed of an even number of chain links. In the shifting of the clutch arms, the maximum shift or terminal coupling position is established by the dimensions of the elongated slots 26 for the toggle stud. The engagement of the latter with the end walls of the slots provides a limit stop for the toggle shift. The rounding of the toggle arm cam surfaces 33—34 provides for a desirable quick and smooth shifting action effective under the momentum of the carriage at the end of its travel motion.

What is claimed is:

1. A transmission mechanism comprising in combination, an endless chain suitably supported and driven in a continuous direction, a carriage to be impelled thereby supported for movement parallel to the chain and clutch means on the carriage consisting of oppositely pivoted clutch arms inwardly extending from their pivots, a toggle connection between the arm inner ends, said clutch arms each being formed with a detent for coupling engagement with the chain, said detents being oppositely extending for engagement alternately with reversely moving tangents of the chain at least one of said clutch arms being formed with spaced recesses, a spring pressed retaining ball supported by the carriage to engage within the recesses and yieldingly retain the arms in the respective shifted positions, and means operative to shift the clutch arms to effect coupling engagement for reversing the motion at the end of each travel motion of the carriage and to act as a safety lock.

2. A reversing drive for a selector switch of an automatic telephone system comprising in combination, an endless chain suitably supported and driven in a continuous direction, a carriage to be impelled thereby mounting the selector switch contacts and supported for movement parallel to the chain, clutch means on the carriage consisting of oppositely positioned fulcrumed clutch arms inwardly extending from their fulcrums, a toggle connection between the arm inner ends, said clutch arms each being formed at the inner ends with a detent for coupling engagement with the chain, said detents being oppositely extending for engagement alternately with reversely moving tangents of the chain, at least one of said arms being formed with intermediate widened portions, recesses in said widened portions facing toward the carriage in spaced relation corresponding to the limit of the arm shift lugs formed on the front of the carriage, spring pressed retaining balls fitting within said lugs to engage said recesses, and yieldingly retain the arms in the shifted positions and abutment means operative to engage the outer ends of the arms and to shift the clutch arms to effect coupling engagement for reversing motion at the end of each travel motion of the carriage and to act as a safety lock.

3. A reversing driving clutch in a transmission mechanism for reversing the motion of an endless chain driven carriage comprising a pair of pivotally supported clutch arms extending towards one another from the pivot points, a toggle connection between the two arms at the ends projecting towards one another, and a detent in each arm oppositely extending from the pivoted ends of said arms to couple them alternately to the reaches of the chain.

4. A device according to claim 3, and in which each arm is pivotally supported on a bearing stud and a spacing stud attached to the carriage by a screw.

5. The device according to claim 3, and in which elongated apertures for the toggle are provided in the ends projecting towards one another.

6. The device according to claim 3, and in which the toggle comprises a screw stud secured by a locknut.

7. The device according to claim 3, and in which each detent is formed integrally with an arm and registers with openings of the chain.

8. The device according to claim 3, and in which each arm has oppositely directly curved cam surfaces on the ends projecting away from one another.

9. The device according to claim 3, and in which abutment means engage the cam surfaces, to effect angular positioning of a clutch arm and make it self-locking when coupled to a chain.

10. The device according to claim 3, and in which oppositely disposed abutment means supported within the chain area engage the cam surfaces and shift the clutch arms alternately past center to couple them to opposite reaches of the chain, thereby reversing the motion of the carriage at the end of each travel thereof.

11. A reversing drive for a selector switch of an automatic telephone system comprising in combination an endless chain driven in a continuous direction, a carriage for mounting the selector switch contacts, clutch means on the carriage comprising a pair of oppositely positioned pivoted arms inwardly extending from their pivot points, camming surfaces formed on the outwardly extending portions of the arms, a toggle connection between the inner ends of the arms, a detent in each arm oppositely extending therefrom and positioned for engagement alternately with reversely moving reaches of the chain, and means operative to shift the clutch arms into engagement for reversing the motion at the end of each travel motion of the carriage.

PAUL BARTELT.

REFERENCES CITED

The following references are of record in the file of this patent:

UNITED STATES PATENTS

| Number | Name | Date |
|---|---|---|
| 1,774,356 | Cloud | Aug. 26, 1930 |
| 1,935,234 | White | Nov. 14, 1933 |

FOREIGN PATENTS

| Number | Country | Date |
|---|---|---|
| 17,065 | Netherlands | Feb. 15, 1928 |